US012681828B2

(12) United States Patent
Zhu et al.

(10) Patent No.: US 12,681,828 B2
(45) Date of Patent: Jul. 14, 2026

(54) DATA TRANSACTION ANOMALY DETECTION ENHANCEMENT

(71) Applicant: INTERNATIONAL BUSINESS MACHINES CORPORATION, Armonk, NY (US)

(72) Inventors: Bo Chen Zhu, Xi'an (CN); Mai Zeng, Shi Jing Shan (CN); Min Cheng, Beijing (CN); Sheng Yan Sun, Beijing (CN); Meng Wan, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 18/678,285

(22) Filed: May 30, 2024

(65) Prior Publication Data

US 2025/0370895 A1    Dec. 4, 2025

(51) Int. Cl.
*G06F 11/30* (2006.01)
*G06F 11/00* (2006.01)

(52) U.S. Cl.
CPC ........ *G06F 11/3072* (2013.01); *G06F 11/006* (2013.01); *G06F 2201/87* (2013.01)

(58) Field of Classification Search
CPC .... G06F 11/006; G06F 11/3072; G06F 11/07; G06F 2201/87
See application file for complete search history.

(56) References Cited

U.S. PATENT DOCUMENTS 10,223,398 B2 * 3/2019 Qin ...................... G06F 16/248
10,740,310 B2   8/2020 Galwick et al.

11,815,989 B2 * 11/2023 Harutyunyan ........ G06F 11/079
12,174,689 B1 * 12/2024 Mozaffari .............. G06N 20/00
2017/0171580 A1 * 6/2017 Hirsch .................... H04L 67/62
(Continued)

FOREIGN PATENT DOCUMENTS

CN        107528722 B    12/2017
CN        111562996 A    8/2020
(Continued)

OTHER PUBLICATIONS

Improving Classification Using Preprocessing and Machine Learning Algorithms on NSL-KDD Dataset by Deshmukh Published in 2015 International Conference on Communication, Information & Computing Technology https://ieeexplore.ieee.org/stamp/stamp.jsp?tp=&arnumber=7045674 (Year: 2015).*
(Continued)

*Primary Examiner* — Joseph O Schell

(74) *Attorney, Agent, or Firm* — Harrity & Harrity, LLP

(57)    ABSTRACT

Noisy data parsed from raw data can be received. The noisy data indicates first transaction events determined to be noise in the raw data. Using the noisy data, a first detection model can be trained to assign anomaly event indicators to second transaction events. The first detection model can receive an anomaly record. The anomaly record can indicate at least a portion of anomalous transaction events identified in runtime data. The first detection mode can assign the anomaly event indicators to the anomalous transaction events. The anomaly event indicators can indicate levels of severity of the anomalous transaction events identified in the runtime data.

20 Claims, 12 Drawing Sheets

(56) References Cited

U.S. PATENT DOCUMENTS

| | | | | |
|---|---|---|---|---|
| 2019/0130223 A1* | 5/2019 | Anderson | .............. | G06N 3/045 |
| 2020/0167653 A1 | 5/2020 | Manjunath et al. | | |
| 2021/0303431 A1* | 9/2021 | Grigoryan | ........... | G06F 11/3476 |
| 2022/0121507 A1* | 4/2022 | Jha | ........................ | G06F 9/546 |
| 2022/0318118 A1* | 10/2022 | Adamson | ........... | G06F 11/3419 |
| 2024/0026836 A1* | 1/2024 | Gujar | ................. | F02D 41/2474 |

FOREIGN PATENT DOCUMENTS

| | | |
|---|---|---|
| CN | 117609921 A | 2/2024 |
| IN | 202341058336 A | 9/2023 |
| WO | 2025/247551 A1 | 12/2025 |

OTHER PUBLICATIONS

Wikipedia's Cluster Analysis historical version published Apr. 27, 2024 https://en.wikipedia.org/w/index.php?title=Cluster_analysis &oldid=1221055266 (Year: 2024).*

Ahmad et al., "Unsupervised real-time anomaly detection for streaming data", Neurocomputing vol. 262, Nov. 1, 2017, pp. 134-147, XP085140328.

Herath et al., "RAMP: Real-Time Anomaly Detection in Scientific Workflows", 2019 IEEE International Conference on Big Data (Big Data), Dec. 9, 2019, pp. 1367-1374, XP033721062.

International Searching Authority, "Notification of Transmittal of the International Search Report and the Written Opinion of the International Searching Authority, or Declaration," Patent Cooperation Treaty May 23, 2025, 14 pages, International Application No. PCT/ EP2025/060280.

Nassar, M. et al., "Blockchain for Explainable and Trustworthy Artificial Intelligence," Wiley Interdisciplinary Reviews: Data Mining and Knowledge Discovery, Jan. 2020., vol. 10, No. 1, e1340, 13 pg.

Mell, P. et al., The NIST Definition of Cloud Computing, National Institute of Standards and Technology, U.S. Dept. of Commerce, Special Publication 800-145, Sep. 2011, 7 pg.

\* cited by examiner

100

400

500

DETERMINE A DELTA ($\Delta$) VALUE
FOR A TRANSACTION EVENT AS A
DIFFERENCE BETWEEN A VALUE OF
THE TRANSACTION EVENT AND A
CLOSEST BASELINE VALUE
502

GROUP THE DELTA ($\Delta$) VALUE AND
THE VALUE OF THE TRANSACTION
EVENT INTO A VECTOR PAIR ($\Delta$, $v$)
504

STORE THE VECTOR PAIR ($\Delta$, $v$)
506

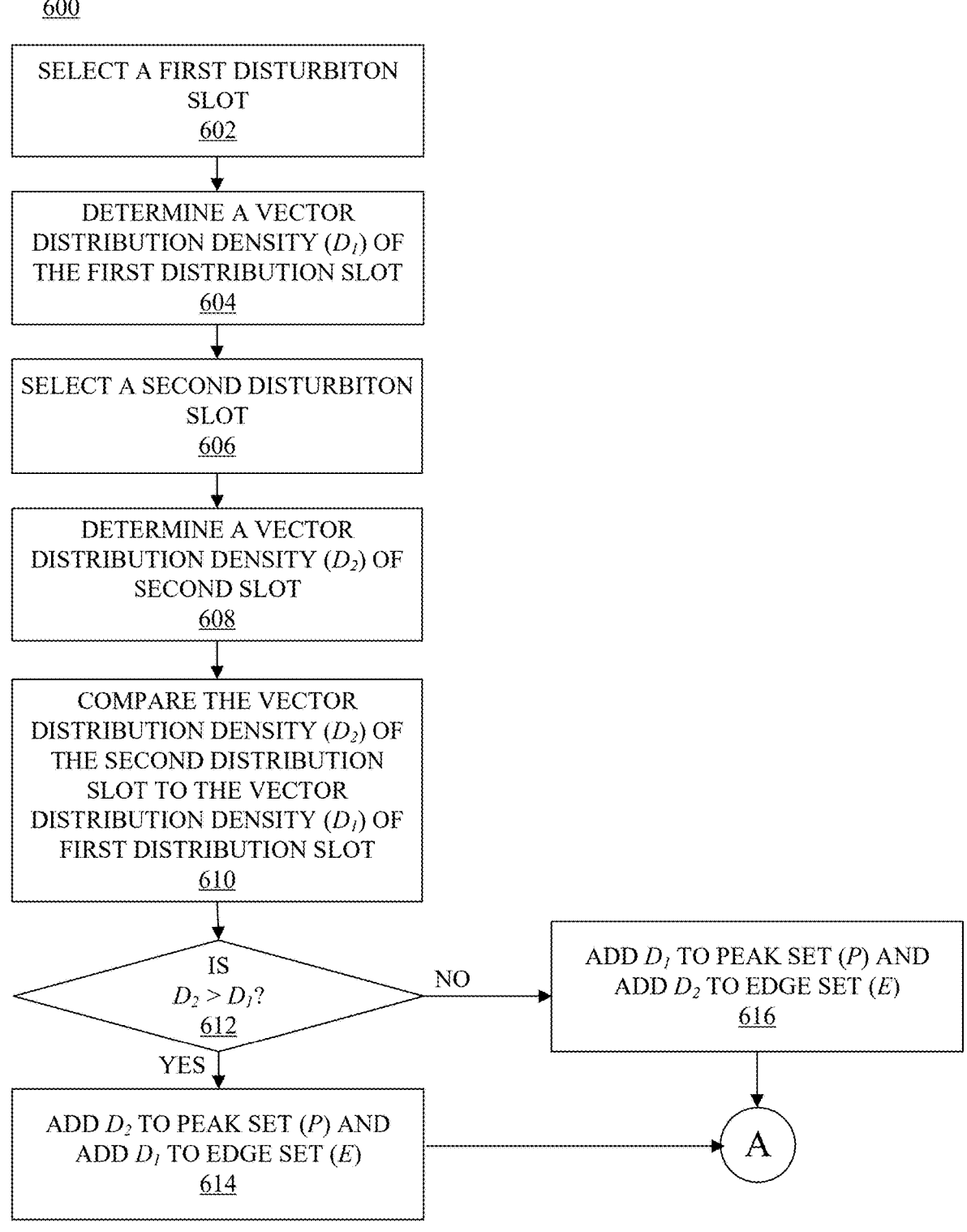

600

SELECT A FIRST DISTURBITON SLOT
602

DETERMINE A VECTOR DISTRIBUTION DENSITY ($D_1$) OF THE FIRST DISTRIBUTION SLOT
604

SELECT A SECOND DISTURBITON SLOT
606

DETERMINE A VECTOR DISTRIBUTION DENSITY ($D_2$) OF SECOND SLOT
608

COMPARE THE VECTOR DISTRIBUTION DENSITY ($D_2$) OF THE SECOND DISTRIBUTION SLOT TO THE VECTOR DISTRIBUTION DENSITY ($D_1$) OF FIRST DISTRIBUTION SLOT
610

IS $D_2 > D_1$?
612

NO

ADD $D_1$ TO PEAK SET ($P$) AND ADD $D_2$ TO EDGE SET ($E$)
616

YES

ADD $D_2$ TO PEAK SET ($P$) AND ADD $D_1$ TO EDGE SET ($E$)
614

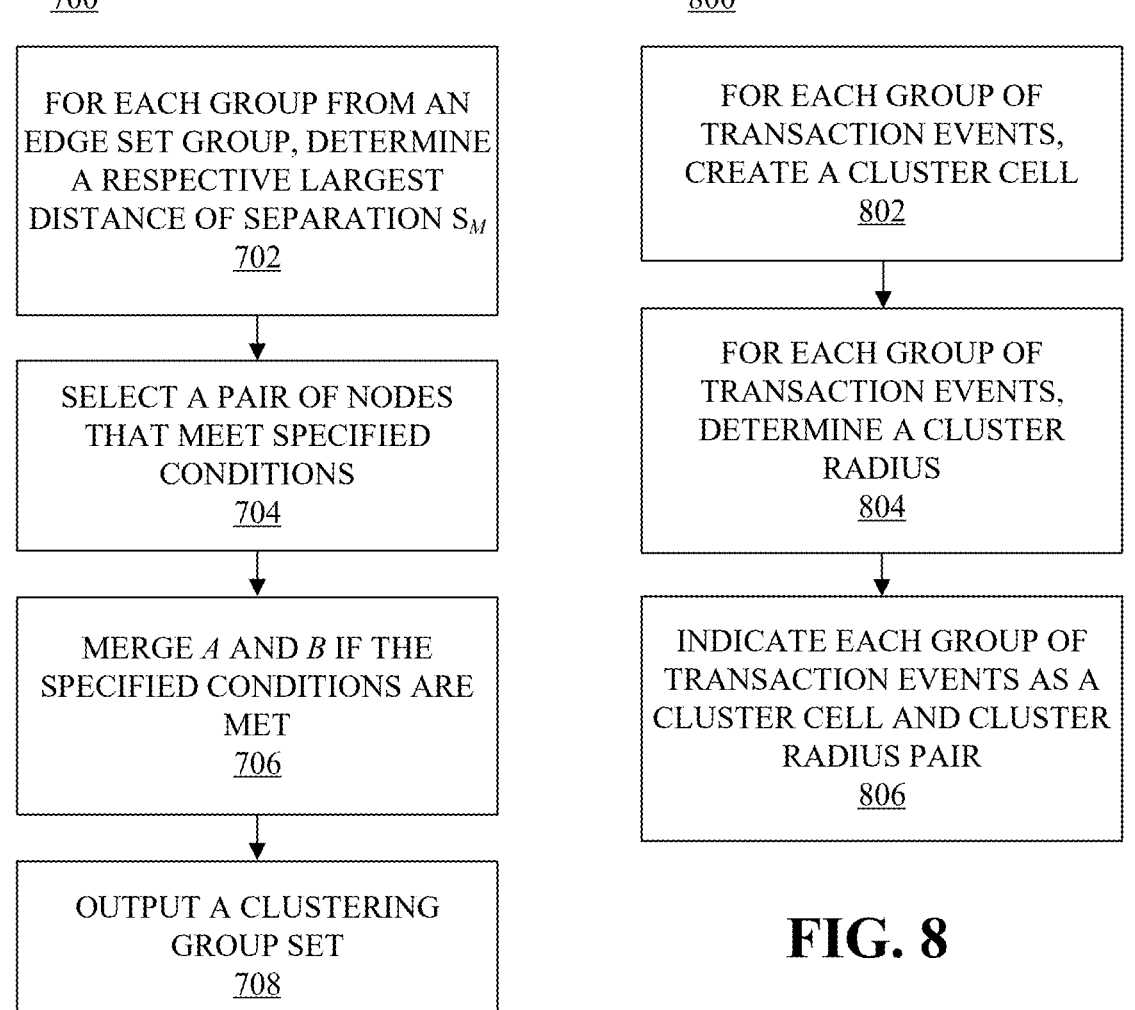

FOR EACH GROUP FROM AN EDGE SET GROUP, DETERMINE A RESPECTIVE LARGEST DISTANCE OF SEPARATION $S_M$
702

SELECT A PAIR OF NODES THAT MEET SPECIFIED CONDITIONS
704

MERGE $A$ AND $B$ IF THE SPECIFIED CONDITIONS ARE MET
706

OUTPUT A CLUSTERING GROUP SET
708

FOR EACH GROUP OF TRANSACTION EVENTS, CREATE A CLUSTER CELL
802

FOR EACH GROUP OF TRANSACTION EVENTS, DETERMINE A CLUSTER RADIUS
804

INDICATE EACH GROUP OF TRANSACTION EVENTS AS A CLUSTER CELL AND CLUSTER RADIUS PAIR
806

DATA TRANSACTION ANOMALY DETECTION ENHANCEMENT

BACKGROUND

The present invention relates to data processing systems, and more specifically, to data transaction anomaly detection.

Q replication and SQL replication are technologies that move large volumes of data at high speeds to help businesses connect globally distributed operations, respond quickly to customers, and rapidly recover from problems that affect critical database systems. Event publishing captures changed-data events and publishes them as messages that can be used by other applications to drive subsequent processing. A replication server is used track changes to source databases and copy (or "replicate") some or all of the changes to target databases. To detect these changes, a capture process continuously reads a database recovery log, and another process incorporates (or "applies") the changes at the target database.

SUMMARY

A method includes receiving noisy data parsed from raw data, the noisy data indicating first transaction events determined to be noise in the raw data. The method also can include training, using the noisy data and a processor, a first detection model to assign anomaly event indicators to second transaction events. The method also can include receiving, by the first detection model, an anomaly record, the anomaly record indicating at least a portion of anomalous transaction events identified in runtime data. The method also can include assigning, by the first detection model, the anomaly event indicators to the anomalous transaction events, the anomaly event indicators indicating levels of severity of the anomalous transaction events identified in the runtime data.

A system includes a processor programmed to initiate executable operations. The executable operations include the process described by the above method.

A computer program product includes one or more computer readable storage mediums having program code stored thereon. The program code stored on the one or more computer readable storage mediums is collectively executable by a data processing system to initiate operations including the process described by the above method.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIGS. 6A and 6B, together, are a flowchart illustrating a method of performing a noisy data distribution scan.

FIG. 7 is a flowchart illustrating a method of performing a group validation of transaction events.

FIG. 8 is a flowchart illustrating a method of clustering transaction events into cluster cells.

DETAILED DESCRIPTION

Figure 1:
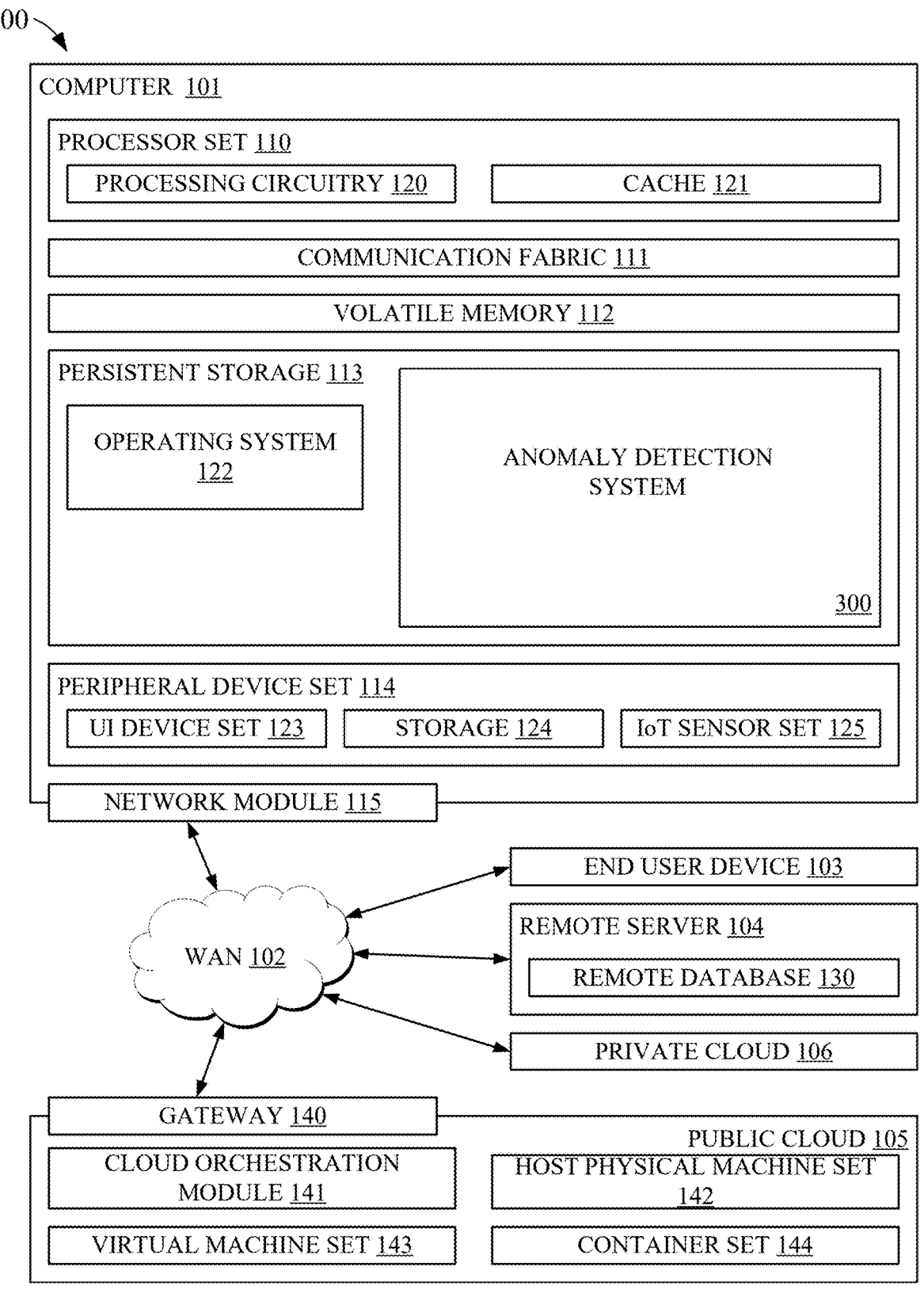
FIG. 1 is a block diagram illustrating an example of a network data processing system.

The present invention relates to data processing systems, and more specifically, to data transaction anomaly detection.

The arrangements described herein are directed to computer technology, and provide an improvement to computer technology. Specifically, the present arrangements improve data transaction anomaly detection.

According to an aspect of the invention, there is provided a method to receive noisy data parsed from raw data, the noisy data indicating first transaction events determined to be noise in the raw data, training, using the noisy data and a processor, a first detection model to assign anomaly event indicators to second transaction events, receiving, by the first detection model, an anomaly record, the anomaly record indicating at least a portion of anomalous transaction events identified in runtime data, and assigning, by the first detection model, the anomaly event indicators to the anomalous transaction events, the anomaly event indicators indicating levels of severity of the anomalous transaction events identified in the runtime data. This serves to improve accuracy of anomalous transaction event detection. This also serves to reduce occurrences of false alerts pertaining to anomalous transaction events.

In embodiments, the first detection model includes a plurality of cluster cells, each cluster cell representing a respective transaction event group, and a respective cluster radius for each of the plurality of cluster cells. This serves to facilitate determination of transaction event groups to which anomalous transaction events belong or are closest.

In embodiments, the training, using the noisy data, the first detection model to assign the anomaly event indicators to the second transaction events includes generating a respective vector pair for each of a plurality of the first transaction events determined to be noise in the raw data, each vector pair including a delta value for a respective first transaction event and a value of the respective transaction event, determining transaction event groups based on the vector pairs, and clustering the transaction event groups into the cluster cells. This also serves to facilitate determination of transaction event groups to which anomalous transaction events belong or are closest.

In embodiments, the assigning, by the first detection model, the anomaly event indicators to the anomalous transaction events includes selecting an anomalous transaction event from the anomaly record, determining a distance between the selected anomalous transaction event and each of a plurality of cluster cells, and determining the selected anomalous transaction event to belong to a transaction event group based on the distance between the selected transaction event and the cluster cell for that transaction event group being less than or equal to a radius of the cluster cell. This serves to improve the accuracy of determining to which transaction event groups anomalous transaction events belong.

In embodiments, the assigning, by the first detection model, the anomaly event indicators to the anomalous transaction events includes selecting an anomalous transaction event from the anomaly record, determining a distance between the selected anomalous transaction event and each of a plurality of cluster cells, and determining a transaction event group to which the selected anomalous transaction event is closest. This serves to improve the accuracy of determining to which transaction event groups anomalous transaction events are closest.

In embodiments, the receiving, by the first detection model, the anomaly record includes the first detection model receiving the anomaly record from a second detection model processing the runtime data. This serves to facilitate and improve runtime detection of anomalous transaction events.

In embodiments, the method includes outputting, by the first detection model, augmented anomaly transaction events, the augmented anomaly transaction events including the anomaly event indicators, receiving at least one user input indicating an augmented anomaly transaction event is incorrectly identified and, responsive to receiving the at least one user input indicating the augmented anomaly transaction event is incorrectly identified, refining, based on the at least one user input, the first detection model to improve accuracy of the first detection model at determining the augmented anomaly transaction events. This serves to improve accuracy of the first detection model at transaction anomaly detection.

According to an aspect of the invention, there is provided a system to receive noisy data parsed from raw data, the noisy data indicating first transaction events determined to be noise in the raw data, training, using the noisy data, a first detection model to assign anomaly event indicators to second transaction events, receiving, by the first detection model, an anomaly record, the anomaly record indicating at least a portion of anomalous transaction events identified in runtime data, and assigning, by the first detection model, the anomaly event indicators to the anomalous transaction events, the anomaly event indicators indicating levels of severity of the anomalous transaction events identified in the runtime data. This serves to improve the accuracy of anomalous transaction event detection. This also serves to reduce occurrences of false alerts pertaining to anomalous transaction events.

In embodiments, the first detection model includes a plurality of cluster cells, each cluster cell representing a respective transaction event group, and a respective cluster radius for each of the plurality of cluster cells. This serves to facilitate determination of transaction event groups to which anomalous transaction events belong or are closest.

In embodiments, the training, using the noisy data, the first detection model to assign the anomaly event indicators to the second transaction events includes generating a respective vector pair for each of a plurality of the first transaction events determined to be noise in the raw data, each vector pair including a delta value for a respective first transaction event and a value of the respective transaction event, determining transaction event groups based on the vector pairs, and clustering the transaction event groups into the cluster cells. This also serves to facilitate determination of transaction event groups to which anomalous transaction events belong or are closest.

In embodiments, the assigning, by the first detection model, the anomaly event indicators to the anomalous transaction events includes selecting an anomalous transaction event from the anomaly record, determining a distance between the selected anomalous transaction event and each of a plurality of cluster cells, and determining the selected anomalous transaction event to belong to a transaction event group based on the distance between the selected transaction event and the cluster cell for that transaction event group being less than or equal to a radius of the cluster cell. This serves to improve the accuracy of determining to which transaction event groups anomalous transaction events belong.

In embodiments, the assigning, by the first detection model, the anomaly event indicators to the anomalous transaction events includes selecting an anomalous transaction event from the anomaly record, determining a distance between the selected anomalous transaction event and each of a plurality of cluster cells, and determining a transaction event group to which the selected anomalous transaction event is closest. This serves to improve the accuracy of determining to which transaction event groups anomalous transaction events are closest.

In embodiments, the receiving, by the first detection model, the anomaly record includes the first detection model receiving the anomaly record from a second detection model processing the runtime data. This serves to facilitate and improve runtime detection of anomalous transaction events.

In embodiments, the method includes outputting, by the first detection model, augmented anomaly transaction events, the augmented anomaly transaction events including the anomaly event indicators, receiving at least one user input indicating an augmented anomaly transaction event is incorrectly identified and, responsive to receiving the at least one user input indicating the augmented anomaly transaction event is incorrectly identified, refining, based on the at least one user input, the first detection model to improve accuracy of the first detection model at determining the augmented anomaly transaction events. This serves to improve accuracy of the first detection model at transaction anomaly detection.

According to an aspect of the invention, there is provided a computer program product including one or more computer readable storage mediums having program code stored thereon, the program code stored on the one or more computer readable storage mediums collectively executable by a data processing system to initiate operations including to receive noisy data parsed from raw data, the noisy data indicating first transaction events determined to be noise in the raw data, training, using the noisy data, a first detection model to assign anomaly event indicators to second transaction events, receiving, by the first detection model, an anomaly record, the anomaly record indicating at least a portion of anomalous transaction events identified in runtime data, and assigning, by the first detection model, the anomaly event indicators to the anomalous transaction events, the anomaly event indicators indicating levels of severity of the anomalous transaction events identified in the runtime data. This serves to improve the accuracy of anomalous transaction event detection. This also serves to reduce occurrences of false alerts pertaining to anomalous transaction events.

In embodiments, the first detection model includes a plurality of cluster cells, each cluster cell representing a respective transaction event group, and a respective cluster radius for each of the plurality of cluster cells. This serves to facilitate determination of transaction event groups to which anomalous transaction events belong or are closest.

In embodiments, the training, using the noisy data, the first detection model to assign the anomaly event indicators to the second transaction events includes generating a respective vector pair for each of a plurality of the first transaction events determined to be noise in the raw data, each vector pair including a delta value for a respective first transaction event and a value of the respective transaction event, determining transaction event groups based on the vector pairs, and clustering the transaction event groups into the cluster cells. This also serves to facilitate determination of transaction event groups to which anomalous transaction events belong or are closest.

In embodiments, the assigning, by the first detection model, the anomaly event indicators to the anomalous transaction events includes selecting an anomalous transaction event from the anomaly record, determining a distance between the selected anomalous transaction event and each of a plurality of cluster cells, and determining the selected anomalous transaction event to belong to a transaction event group based on the distance between the selected transaction event and the cluster cell for that transaction event group being less than or equal to a radius of the cluster cell. This serves to improve the accuracy of determining to which transaction event groups anomalous transaction events belong.

In embodiments, the assigning, by the first detection model, the anomaly event indicators to the anomalous transaction events includes selecting an anomalous transaction event from the anomaly record, determining a distance between the selected anomalous transaction event and each of a plurality of cluster cells, and determining a transaction event group to which the selected anomalous transaction event is closest. This serves to improve the accuracy of determining to which transaction event groups anomalous transaction events are closest.

In embodiments, the receiving, by the first detection model, the anomaly record includes the first detection model receiving the anomaly record from a second detection model processing the runtime data. This serves to facilitate and improve runtime detection of anomalous transaction events.

In embodiments, the method includes outputting, by the first detection model, augmented anomaly transaction events, the augmented anomaly transaction events including the anomaly event indicators, receiving at least one user input indicating an augmented anomaly transaction event is incorrectly identified and, responsive to receiving the at least one user input indicating the augmented anomaly transaction event is incorrectly identified, refining, based on the at least one user input, the first detection model to improve accuracy of the first detection model at determining the augmented anomaly transaction events. This serves to improve accuracy of the first detection model at transaction anomaly detection.

The various embodiments described herein provide a number of distinct advantages over prior anomaly detection systems. With prior anomaly detection systems, noise data usually is cleansed in a time series data preprocessing stage, and noisy data is ignored. Rather than ignoring the noisy data, the present embodiments use the noisy data to improve data anomaly detection. For example, data identified as noisy data sometimes may pertain to events that are normal, and the preprocessing stage cleansing to reduce noise may cause a system to generate false alerts. The embodiments described herein analyze data identified as being noisy data and, based such analyses, improve the accuracy of time series data anomaly detection.

In accordance with the present embodiments, an augmented anomaly detection (AAD) model processes runtime data during data anomaly detection for further analysis and confirmation of anomalous events. augmented anomaly detection (AAD) model can determine augmented anomaly transaction events (AATE) that are used to whether an event determined to be anomalous previously was determined to be a normal event. Accordingly, the embodiments described herein greatly reduce the probability of false alarms being generated.

The embodiments described herein can include a trustworthy artificial intelligence (AI) analyzer configured to determine whether augmented anomaly transaction events (AATE) are alerts or system warnings, and enable inputs to be applied for bias refinement, thus improving the accuracy of the augmented anomaly detection (AAD) model. Moreover, the embodiments described herein can further reduce data bias and improve the efficiency and accuracy of detecting time series data anomalies.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as anomaly detection system 300. In addition to block 300, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 300, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 300 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 300 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105.

The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
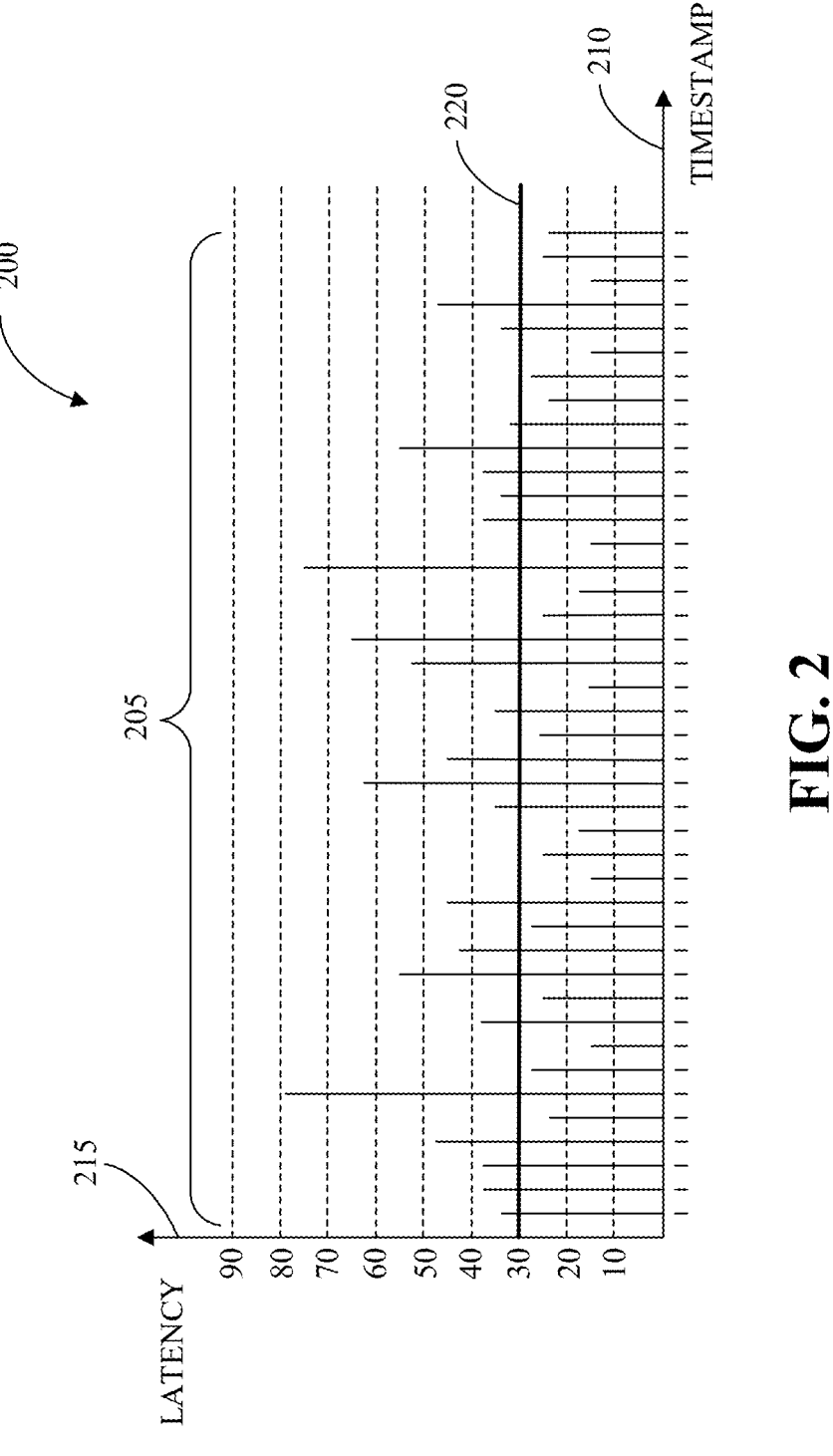
FIG. 2 is a chart depicting example data replication latencies.

FIG. 2 is a chart 200 depicting example data replication latencies 205. In chart 200, the horizontal axis 210 represents time stamps. Each time stamp can indicate, for example, when a respective transaction event took place (e.g., when the transaction event begins or when the transaction event ends). An example of a transaction event is a replication of data from a source database to a destination database.

In this non-limiting example, the vertical axis 215 can represent latency, for example in milliseconds (ms). Latency is a duration time elapsed during a transaction event. For example, a data latency can be the time elapsed between a data replication transaction being committed at a source database and the same data replication transaction being applied at a destination database. In other examples, the vertical axis can represent another parameter, for example memory utilization, processor utilization, a waiting time (e.g., a duration of time from when a transaction is initiated and the transaction is initiated), etc. In further examples, the vertical axis can represent a plurality of parameters. For instance, the vertical axis can represent a combination of latency, memory utilization, processor utilization and/or waiting time.

Line 220 indicates a threshold value (e.g., a threshold latency). In this example, the threshold latency is 30 ms, though the present arrangements are not limited in this regard. Transaction event latencies should be equal to, or less than, the threshold latency. Typically, transaction events for which the latencies 205 exceed the threshold latency are considered noise, and thus ignored after an early stage (e.g., pre-processing stage) of a time series analysis implemented to train transaction anomaly detection models to perform transaction anomaly detection. However, removing the transaction events, for which the latencies 205 exceed the threshold latency, at the pre-processing stage of training the detection models can result in the detection models generating an excessive number of false alerts indicating transaction events as being anomalous, even though the transaction events may not necessarily be anomalous.

The arrangements described herein improve the accuracy of transaction anomaly detection by training an augmented anomaly detection model using transaction events otherwise considered to be noisy data. The anomaly detection model can be implemented at runtime to refine transaction anomaly detection, reducing the number of false alerts being generated for transaction events.

Figure 3:
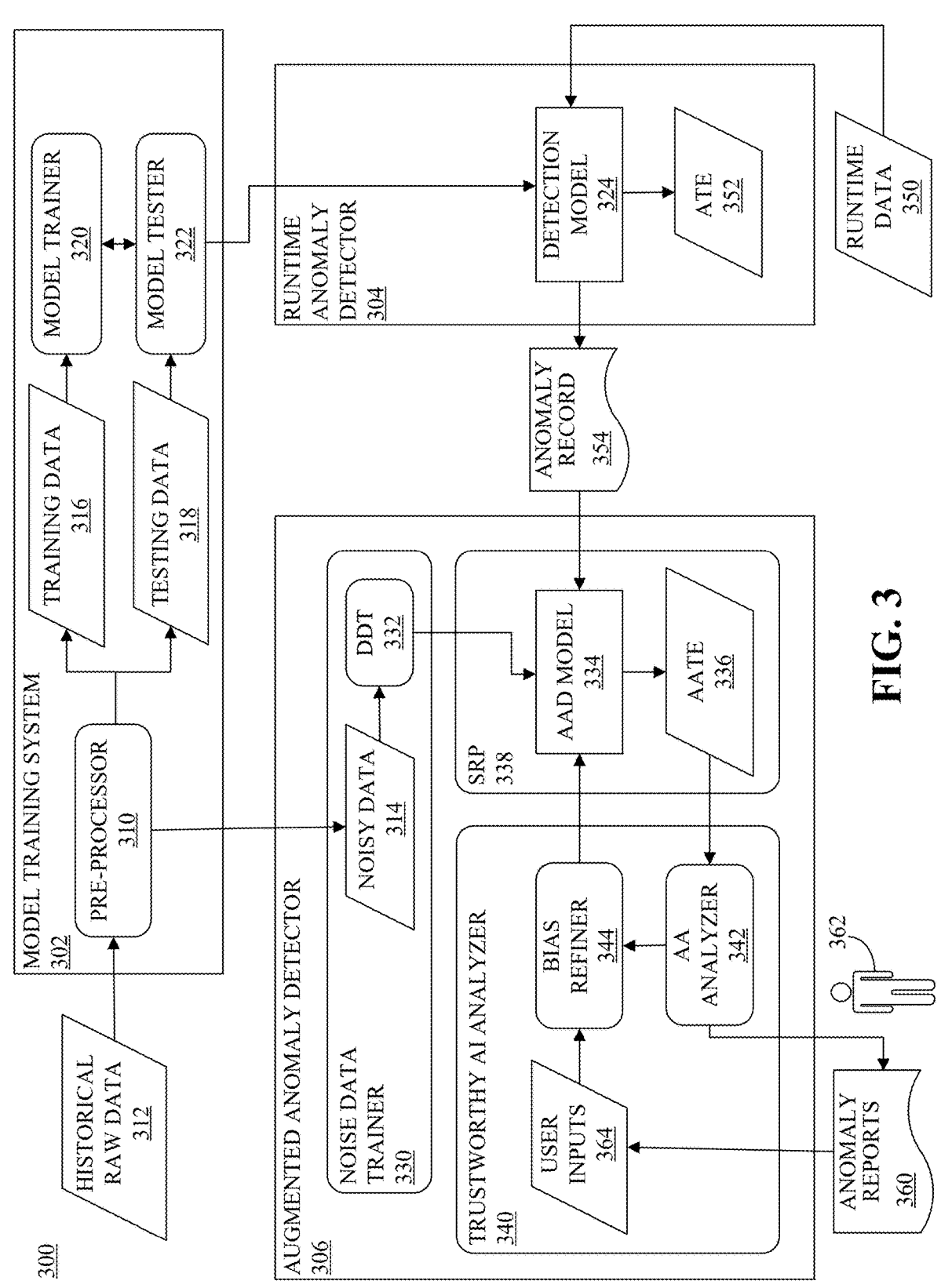
FIG. 3 is a block diagram illustrating example architecture for an anomaly detection system.

FIG. 3 is a block diagram illustrating example architecture for an anomaly detection system 300. Anomaly detection system 300 can detect and analyze abnormal events that occur during data replication, as well as detect and analyze other types of time series data anomalies. Anomaly detection system 300 can include a model training system 302, a runtime anomaly detector 304 and an augmented anomaly detector 306.

Model training system 302 can include a pre-processor 310 configured to receive historical raw data 312 and pre-process historical raw data 312. Pre-processing historical raw data 312 can include parsing noisy data 314 from historical raw data 312. Noisy data 314 can include transaction events in historical raw data 312 that are determined to be noise in the historical raw data 312. In illustration, noisy data 314 can include transaction events for which at least one value of the transaction event differs from an expected value by at least a threshold amount, e.g., exceeds a first threshold value or falls below a second threshold value. Such value can be, for example, a latency 205, although the present arrangements are not limited in this regard. Indeed, the present arrangements can be applied to any other parameter(s) that contribute(s) to a transaction event being considered to be noisy data. Pre-processor 310 can communicate noisy data 314 to augmented anomaly detector 306 for use in augmented anomaly detection.

Pre-processor 310 can parse, from historical raw data 312 not determined to be noisy data 314, training data 316 and testing data 318. Pre-processor 310 can communicate training data 316 to a model trainer 320. Pre-processor 310 can communicate testing data 318 to a model tester 322. In this regard, pre-processor 310 can perform noise reduction processing on historical raw data 312, and separate from historical raw data 312 noise data that can be used as training data 316 and noise data that can be used as testing data 318. For example, pre-processor 310 can randomly select training data 316 and testing data 318 from the noise data. The present arrangements are not limited in this regard, however, and pre-processor 310 can implement any other suitable process for selecting training data 316 and testing data 318.

Using training data 316 and artificial intelligence (AI), model trainer can train a detection model 324 to detect anomalous transaction events. Detection model 324 can include prediction data to which detection model can compare runtime data to determine whether the runtime data contains anomalous transaction events.

Using testing data 318, model tester 322 can test detection model 324, and communicate to model trainer 320 testing results from the test. Using the testing results, model trainer 320 can refine detection model 324 with further AI training. That process can repeat until testing results indicate that specified anomalous event detection requirements are met, or until a threshold level of AI training has been performed on detection model 324. Responsive to the testing results indicating that specified anomalous transaction event detection requirements are met, or the threshold level of AI training being performed on detection model 324, model training system 302 can communicate detection model 324 to runtime anomaly detector 304. Augmented anomaly detector 306 can include a noise data trainer 330. Noise data trainer 330 can include a discrete distribution trainer (DDT) 332. Discrete distribution trainer 332 can be configured to train, for example using AI, an augmented anomaly detection (AAD) model 334 to determine augmented anomaly transaction events (AATE) 336 during a supplementary runtime process (SRP) 338. Augmented anomaly detector 306 also can include, or otherwise can access, a trustworthy AI analyzer 340. Trustworthy AI analyzer 340 can include an augmented anomaly (AA) analyzer 342 and a bias refiner 344.

In operation at runtime, runtime anomaly detector 304 can receive runtime data 350. Runtime data 350 can include data indicating transactions events pertaining to transactions committed during data replication. In one or more arrangements, runtime anomaly detector 304 can receive runtime data 350 in real time as transaction events are generated for transactions committed during data replication. Detection model 324 can process runtime data 350, in real time, to identify anomalous transaction events (ATE) 352 contained in runtime data 350.

To identify anomalous transaction events 352, detection model 324 can compare runtime data 350 to prediction data of the detection model 324. The prediction data can include, for example, a threshold value, a minimum baseline value and/or a maximum baseline value. Based on that comparison, detection model 324 can determine a difference between each transaction event contained in runtime data 350 and the prediction data. In one or more arrangements, transaction events for which the difference reaches a first pre-defined threshold value can be identified, by detection model 324, as being anomalous transaction events 352. In one or more arrangements, a first threshold number of transaction events for which the difference is greatest can be identified, by detection model 324, as being anomalous transaction events 352. Runtime anomaly detector 304 can communicate anomalous transaction events 352 to augmented anomaly detector 306, for example to augmented anomaly analyzer 342.

Detection model 324 also can generate an anomaly record 354. Anomaly record 354 can indicate which of anomalous transaction events 352 are most abnormal. In illustration, in one or more arrangements, detection model 324 can select from anomalous transaction events 352 transaction events for which the difference exceeds a second threshold value, or select from anomalous transaction events 352 a second threshold number of transaction events for which the difference is greatest. Runtime anomaly detector 304 can communicate anomaly record 254 to augmented anomaly detector 306. For example, runtime anomaly detector 304 can communicate anomaly record 354 to augmented anomaly detection model 334. Augmented anomaly detector 306 can initiate augmented anomaly detection model 334 to process anomaly record 354, in real time, to generate augmented anomaly transaction events 336 by assigning anomaly event indicators to anomalous transaction events 352 contained in anomaly record 354. Each anomaly event indicator can indicate a severity of a respective anomalous transaction event 352. Augmented anomaly detection model 334 can structure each anomaly event indicator as follows:

$$\{t_i,\ \text{yes|no},\ j\}$$

where:

t indicates an instance of the augmented anomaly transaction event in anomaly record 354;

i is a record identifier for the augmented anomaly transaction event in anomalous transaction events 352;

j a group identifier for a group to which the augmented anomaly transaction event belongs or is closest;

yes indicates to report the augmented anomaly transaction event as a warning (e.g., a low level anomaly); and no indicates to report the augmented anomaly transaction event as an Alert (e.g., a high level anomaly).

In this example, the terms "yes" and "no" indicate levels of severity of anomalous transaction events 352. Augmented anomaly detection model 334 can communicate augmented anomaly transaction events 336 to augmented anomaly analyzer 342. Augmented anomaly analyzer 342 can process augmented anomaly transaction events 336. Based on such processing, augmented anomaly analyzer 342 can generate anomaly reports 360. Anomaly reports 360 can indicate augmented anomaly transaction events 336. Augmented anomaly analyzer 342 can communicate anomaly reports 360 to bias refiner 344 and output anomaly reports 360 for review, for example by a user 362.

User 362 can review anomaly reports 360 and provide one or more user inputs 364 to bias refiner 344. User inputs 364 can indicate augmented anomaly transaction events 336 that are incorrectly identified. User inputs 364 also can provide corrections for incorrectly identified augmented anomaly transaction events 336 (e.g., changing "yes" to "no," changing "no" to "yes," etc.) Responsive to receiving user inputs 364, based on the user inputs 364 bias refiner 344 can refine augmented anomaly detection model 334 to improve accuracy of augmented anomaly detection model 334 at determining augmented anomaly transaction events 336. Operation of bias refiner 344 is described in further detail with reference to FIG. 12.

Figure 4:
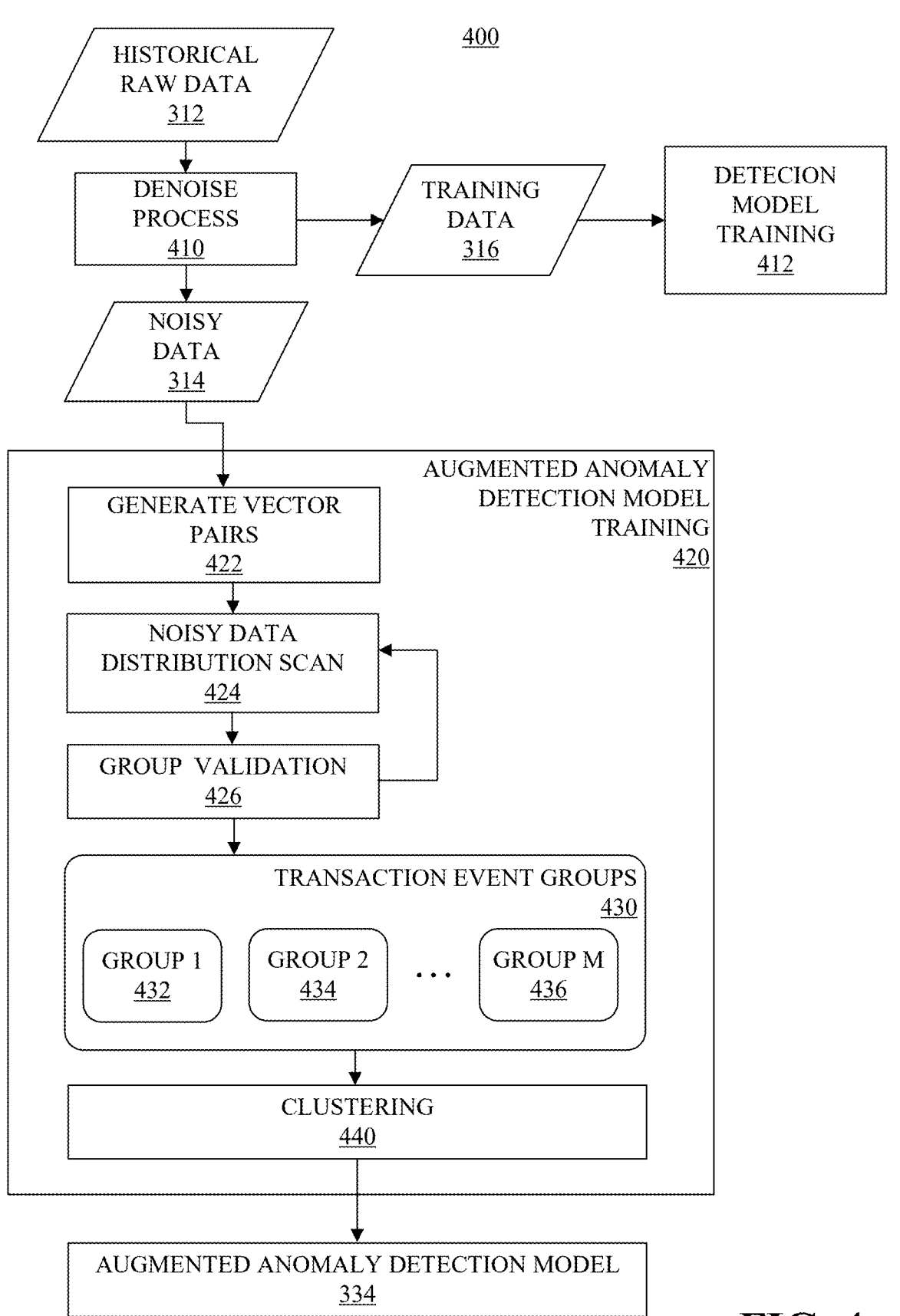
FIG. 4 is a block diagram illustrating an example workflow for denoise model training.

FIG. 4 is a block diagram illustrating an example workflow 400 for denoise model training. Reference now will be made both to FIGS. 3 and 4.

Workflow 400 can include parsing, by pre-processor 310, from historical raw data 312 noisy data 314 and training data 316 by performing a denoise process at step 410. Using training data 316, model trainer 320 can implement AI to perform detection model training at step 412 to train detection model 324. By way of example, model trainer 320 can train detection model 324 to perform AutoRegressive Integrated Moving Average (ARIMA) analysis, which is a time series analysis used for forecasting and modeling time series data.

Discrete distribution trainer 332 can train an augmented anomaly detection model 334 by performing augmented anomaly detection model training 420. Augmented anomaly detection model training 420 can include generating, at step 422, a vector pair for each of a plurality of transaction events contained in noisy data 314. Each vector pair can include a delta (A) value and the value (e.g., a latency, a memory utilization, a processor utilization, waiting time, etc.) for the transaction event for which the vector pair is generated. Step 422 for generating vector pairs is described in further detail with reference to FIG. 5. Augmented anomaly detection model training 420 also can include determining transaction event groups 430, based on the vector pair of each transaction event contained in noisy data 314, by iteratively performing, at step 424, a noisy data distribution scan and, at step 426, a group validation for transaction events contained in noisy data 314. In illustration, the noisy data distribution scan can determine a first group 432 of transaction events and the group validation can validate the first group 432 of transaction events. Further, the distribution scan can determine a second group 434 of transaction events and the group validation can validate the second group 434 of transaction events. Steps 424 and 426 can iterate in this manner until all transaction groups have been validated, for example through transaction event group M 436. Step 424 for performing the noisy data distribution scan is described in further detail with reference to FIG. 6. Step 426 for performing the group validation is further described with reference to FIG. 7. Augmented anomaly detection model training 420 further can include generating augmented anomaly detection model 334 by performing, at step 440, clustering of the transaction event groups 432, 434, 436 into cluster cells. By nature of being generated by augmented anomaly detection model training 420, augmented anomaly detection model 334 can be generated with an initial level of training. Nonetheless, bias refiner 344 can provide additional training of augmented anomaly detection model 334 based on user inputs 364. Step 440 for performing the clustering of the transaction event groups is further described with reference to FIG. 8.

Figure 5:
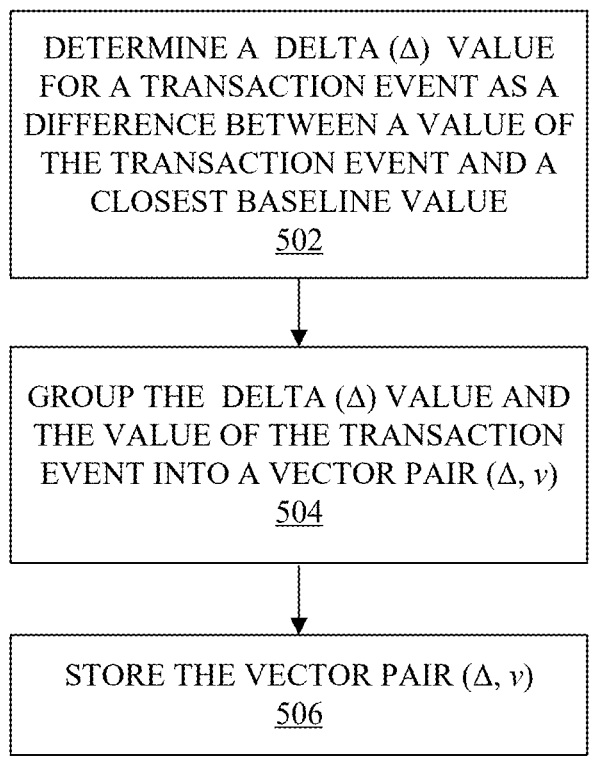
FIG. 5 is a flowchart illustrating a method of determining a vector pair for a transaction event.

FIG. 5 is a flowchart illustrating a method 500 of determining a vector pair for a transaction event. Discrete distribution trainer 332 can implement step 422 of FIG. 4 by performing a process described by method 500.

At step 502, discrete distribution trainer 332 can determine a delta (A) value for the transaction event. The delta value can be a difference between a value of the transaction event and a closest baseline value. The value of the transaction event and the closest baseline value can be, for instance, latency values and/or any other parameter values that contribute to the transaction event value being considered to be noisy data. Examples of such other parameter values include, but are not limited to, amounts of memory utilization, amounts processor utilization, waiting times, etc. The closest baseline value can be a maximum threshold value or a minimum threshold value. A baseline value can be a pre-determined value, but this need not be the case. For example, a minimum baseline value and/or a maximum baseline value, for use in determining a determining a delta value, can be determined based on analyzing other transaction events. In illustration, a minimum baseline value and/or a maximum baseline value can be determined based on a moving average of transaction events that took place prior to the present transaction event. In this example, the moving average can be considered to be an expected value. The minimum baseline value can be determined by subtracting a value (e.g., a pre-determined value) from the moving average, and the maximum baseline value can be determined by adding a value (e.g., a pre-determined value) to the moving average. Nonetheless, the present arrangements are not limited in this regard, and baseline values can be determined in any other suitable manner.

At step 504, discrete distribution trainer 332 can pair the delta value and the value of the transaction event into a vector pair. For example, the vector pair can be structured as follows:

$$(\Delta, v)$$

where:

Δ is the delta value (e.g., a vector); and v is the value (e.g., a vector) of the transaction event.

At step 506, discrete distribution trainer 332 can store the vector pair $(\Delta, v)$.

Figure 6B:
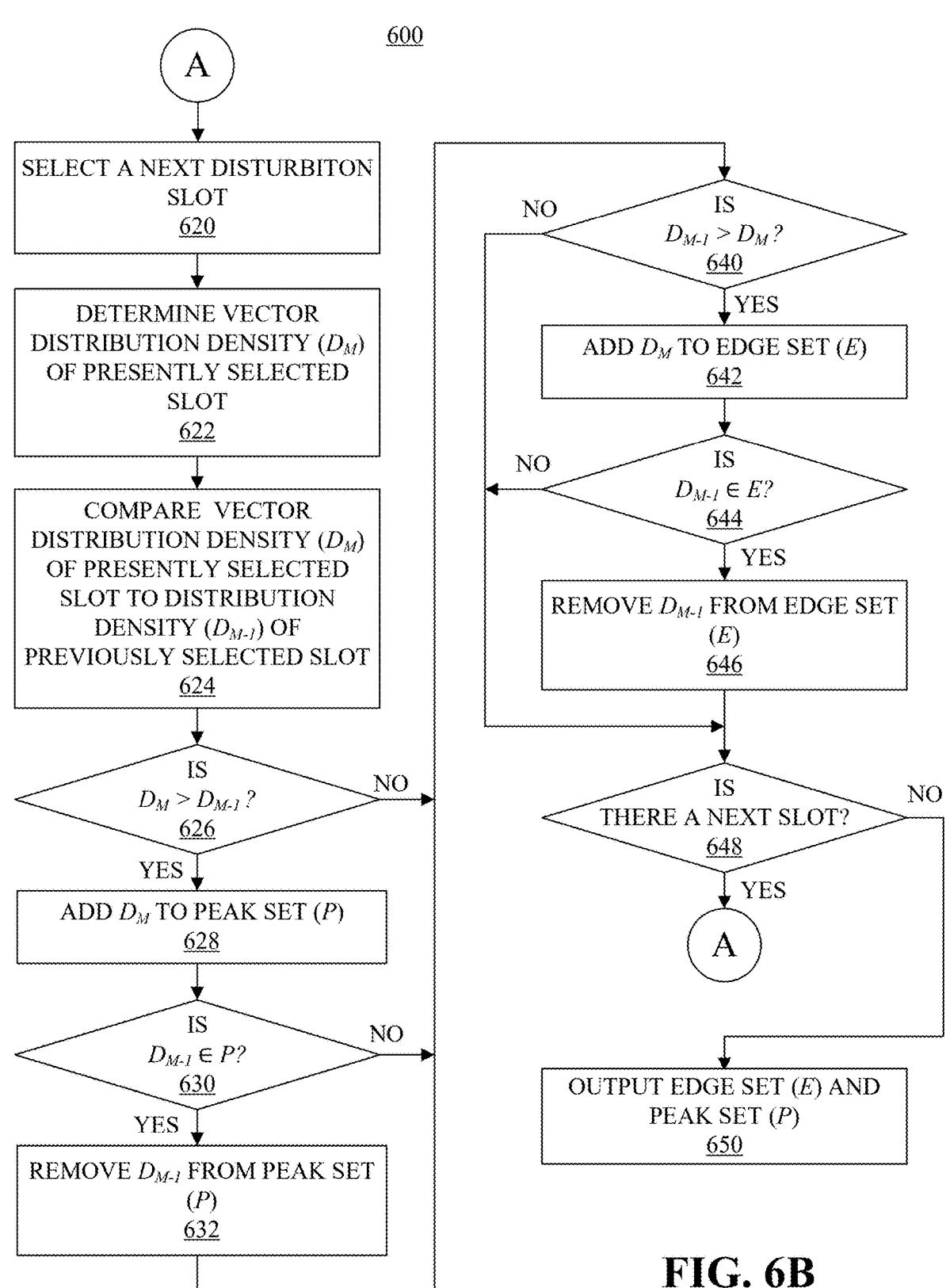

FIGS. 6A and 6B, together, are a flowchart illustrating a method 600 of performing a noisy data distribution scan. Discrete distribution trainer 332 can implement step 424 of FIG. 4 by performing a process described by method 600. . . . Discrete distribution trainer 332 can perform the noisy data distribution scan to identify high points and low points of a data curve, and group the data based on the high points and low points.

Referring to FIG. 6A, at step 602, discrete distribution trainer 332 can select a first distribution slot. A distribution slot is a plurality of similar vector pairs. The size of the distribution slot (i.e., the number of vector pairs in the sequence) can be determined based on a desired level of scan effort, which can be predetermined. Higher accuracy for the noisy data distribution scan can be obtained using smaller distribution slots, but using smaller distribution slots can result in higher use of data processing resources (e.g., processor utilization, memory utilization, etc.). The size of the distribution slot can be selected to balance the use of data processing resources with a desired level of accuracy. For example, the size of the distribution slot can be selected to be the largest distribution slot that still will result in the desired level of accuracy.

At step 604, discrete distribution trainer 332 can determine a vector distribution density $(D_1)$ of the first distribution slot. For example, the vector distribution density $(D_1)$ can be determined to be a number $(d_1)$ of vector pairs distributed in the first distribution slot.

At step 606, discrete distribution trainer 332 can select a second distribution slot. The second distribution slot can immediately follow the first distribution slot, though the present arrangements are not limited in this regard. There need not be any overlap between the first distribution slot and the second distribution slot, but again the present arrangements are not limited in this regard.

At step 608, discrete distribution trainer 332 can determine a vector distribution density $(D_2)$ of the second distribution slot. For example, the vector distribution density $(D_2)$ can be determined to be a number $(d_2)$ of vector pairs distributed in the second distribution slot.

At step 610, discrete distribution trainer 332 can compare the vector distribution density $(D_2)$ of the second distribution slot to the vector distribution density $(D_1)$ of the first distribution slot.

Referring to decision box 612, if the vector distribution density $(D_2)$ of the second distribution slot is greater than the vector distribution density $(D_1)$ of the first distribution slot, i.e., $(D_2 > D_1)$, at step 614 discrete distribution trainer 332 can add the vector distribution density $(D_2)$ of the second distribution slot to a peak set (P) and add the vector distribution density $(D_1)$ of the first distribution slot to an edge set (E). If, however, the vector distribution density $(D_2)$ of the second distribution slot is not greater than the vector distribution density $(D_1)$ of the first distribution slot, i.e., $(D_2 \ngtr D_1)$, at step 616 discrete distribution trainer 332 can add the vector distribution density $(D_1)$ of the first distribution slot to peak set (P) and add the vector distribution density $(D_2)$ of the second distribution slot to edge set (E).

Referring to FIG. 6B, the process can continue to step 620. At step 20, discrete distribution trainer 332 can select a next distribution slot.

At step 622, discrete distribution trainer 332 can determine a vector distribution density $(D_m)$ of the selected distribution slot. For example, the vector distribution density $(D_M)$ can be determined to be a number $(d_M)$ of vector pairs distributed in the selected distribution slot.

At step 624, discrete distribution trainer 332 can compare the vector distribution density $(D_M)$ of the presently selected distribution slot to the vector distribution density $(D_{M-1})$ of the previously selected distribution slot. In illustration, during a first instance of step 624, the vector distribution density $(D_M)$ can be vector distribution density $(D_3)$ of a third distribution slot, and the vector distribution density $(D_3)$ of the third distribution slot can be compared to the vector distribution density $(D_2)$ of the second distribution slot. During a second instance of step 624, the vector distribution density $(D_M)$ can be vector distribution density $(D_4)$ of a fourth distribution slot, and the vector distribution density $(D_4)$ of the fourth distribution slot can be compared to the vector distribution density $(D_3)$ of the third distribution slot, and so on.

Referring to decision box 626, if the vector distribution density $(D_M)$ of the presently selected distribution slot is not greater than the vector distribution density $(D_{M-1})$ of the previously selected distribution slot, i.e., $(D_M \ngtr D_{M-1})$, the process can proceed to decision box 640. However, if the vector distribution density $(D_M)$ of the presently selected distribution slot is greater than the vector distribution density $(D_{M-1})$ of the previously selected distribution slot, i.e., $(D_M > D_{M-1})$, at step 628 discrete distribution trainer 332 can add the vector distribution density $(D_M)$ of the presently selected distribution slot to peak set (P).

Referring to decision box 630, if the vector distribution density $(D_{M-1})$ of the previously selected distribution slot is not an element of peak set (P), the process can proceed to decision box 640. However, if the vector distribution density $(D_{M-1})$ of the previously selected distribution slot is an element of peak set (P), at step 632 discrete distribution trainer 332 can remove from peak set (P) the vector distribution density $(D_{M-1})$ of the previously selected distribution slot. In this regard, in peak set (P) the vector distribution density $(D_M)$ of the presently selected distribution slot can replace the vector distribution density $(D_{M-1})$ of the previously selected distribution slot if the vector distribution density $(D_M)$ of the selected distribution slot is greater than the vector distribution density $(D_{M-1})$ of the previously selected distribution slot, i.e., $(D_M > D_{M-1})$, and the vector distribution density $(D_{M-1})$ of the previously selected distribution slot is an element of peak set (P).

Referring to decision box 640, if the vector distribution density $(D_{M-1})$ of the previously selected distribution slot is not greater than the vector distribution density $(D_M)$ of the presently selected distribution slot, i.e., $(D_{M-1} + D_M)$, the process can proceed to decision box 648. However, if the vector distribution density $(D_{M-1})$ of the previously selected distribution slot is greater than the vector distribution density ($D_M$) of the presently selected distribution slot, i.e., ($D_{M-1} > D_M$), at step 642 discrete distribution trainer 332 can add the vector distribution density ($D_M$) of the presently selected distribution slot to edge set (E).

Referring to decision box 644, if the vector distribution density ($D_{M-1}$) of the previously selected distribution slot is not an element of edge set (E), the process can proceed to decision box 648. If, however, the vector distribution density ($D_{M-1}$) of the previously selected distribution slot is an element of edge set (E), at step 646 discrete distribution trainer 332 can remove from edge set (E) the vector distribution density ($D_{M-1}$) of the previously selected distribution slot. In this regard, in edge set (E) the vector distribution density ($D_M$) of the presently selected distribution slot can replace the vector distribution density ($D_{M-1}$) of the previously selected distribution slot if the vector distribution density ($D_{M-1}$) of the previously selected distribution slot is greater than the vector distribution density ($D_M$) of the presently selected distribution slot, i.e., ($D_{M-1} > D_M$), and the vector distribution density ($D_{M-1}$) of the previously selected distribution slot is an element of edge set (E).

Referring to decision box 648, discrete distribution trainer 332 can determine whether there is a next distribution slot to be selected. If so, the process can return to step 620 and reiterate. If, however, there is not a next distribution slot to be selected, at step 650, discrete distribution trainer 332 can output edge set (E) and peak set (P).

FIG. 7 is a flowchart illustrating a method 700 of performing a group validation of transaction events. Discrete distribution trainer 332 can implement step 426 of FIG. 4 by performing a process described by method 700.

At step 702, discrete distribution trainer 332 can, for each pair of nodes in an edge set group, determine a respective distance of separation ($S_M$) between the pair of nodes. Each distance of separation ($S_M$) can be an absolute value of a difference between the respective vector distribution densities of two nodes in an edge set group. Thus, each node in an edge set group can be compared to every other node in that edge set group to determine a respective distance of separation ($S_M$), and the largest distance of separation ($S_M$) for that edge set group can be determined.

At step 704, discrete distribution trainer 332 can select the pair of nodes having the largest distance of separation ($S_M$) if that pair of nodes meet a specified condition. The specified condition can be the following:

$$\forall\, a \in A$$

$$\exists\, b \in B; \text{ and}$$

$$\text{S.T. } \|a - b\| \le D_{ls}$$

where:
    a is a vector that is an element of edge set group A;
    b is a vector that is an element of edge set group B;
    $D_{ls}$ a distance between a largest vector and a smallest vector in edge set group A; and
    S.T. means "such that."

Thus, for any vector a in an edge set group A, if there exists vector b in an edge set group B, and the distance between vector a and vector b is less than distance $D_{ls}$, edge set group A and edge set group B can be merged. Accordingly at step 706, if the specified conditions are met, discrete distribution trainer 332 can merge edge set group A and edge set group B.

At step 708, discrete distribution trainer 332 can output a clustering group set, e.g., $\{G_1, G_2, \ldots G_M\}$.

FIG. 8 is a flowchart illustrating a method of clustering transaction events into cluster cells. Discrete distribution trainer 332 can determine transaction event groups 430 of FIG. 4 by performing a process described by method 800.

At step 802, discrete distribution trainer 332 can, for each transaction event group 432, 434, 436, create a cluster cell. The cluster cells can be, for example, $\{C_1, C_2, \ldots C_M\}$.

At step 804, discrete distribution trainer 332 can, for each transaction event group 432, 434, 436, determine a cluster radius. The cluster radius for a cell can be a radius from a core of the cell to an edge of the cell.

At step 806, discrete distribution trainer 332 can output the cluster cells with their respective cluster radii as augmented anomaly detection model 334, for example using the following format:

$$\{(C_1, r_1), (C_2, r_2), \ldots (C_M, r_M)\}$$

Figure 9:
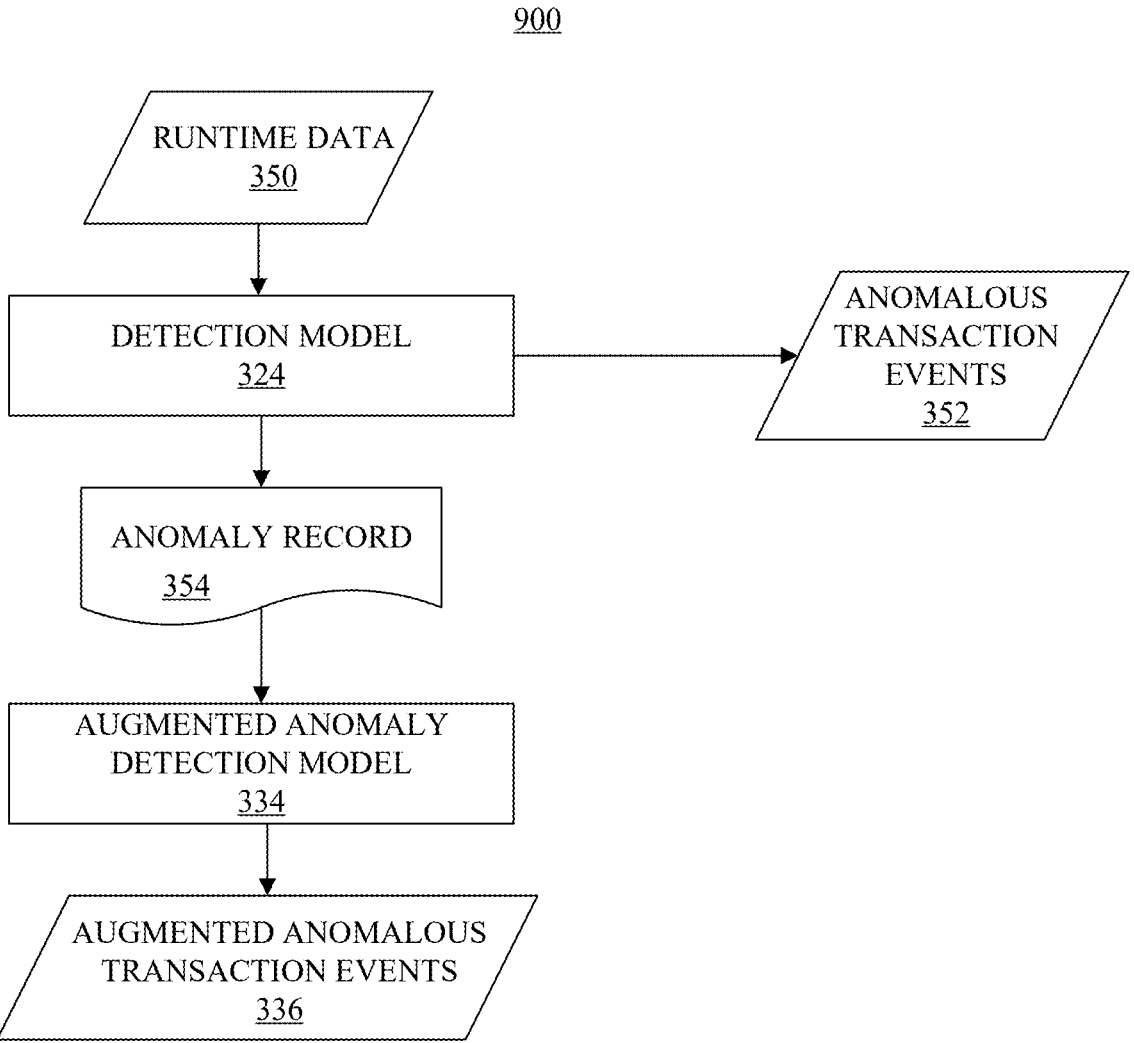
FIG. 9 is a block diagram illustrating an example workflow for transaction event noise detection.

FIG. 9 is a block diagram illustrating an example workflow 900 for transaction event noise detection. Detection model 324 can process runtime data 350. By processing runtime data 350, detection model 324 can determine anomalous transaction events 352 and generate anomaly record 254. Augmented anomaly detection model 334 can process anomaly record 354 and, based on such processing, determine augmented anomaly transaction events 336.

Figure 10:
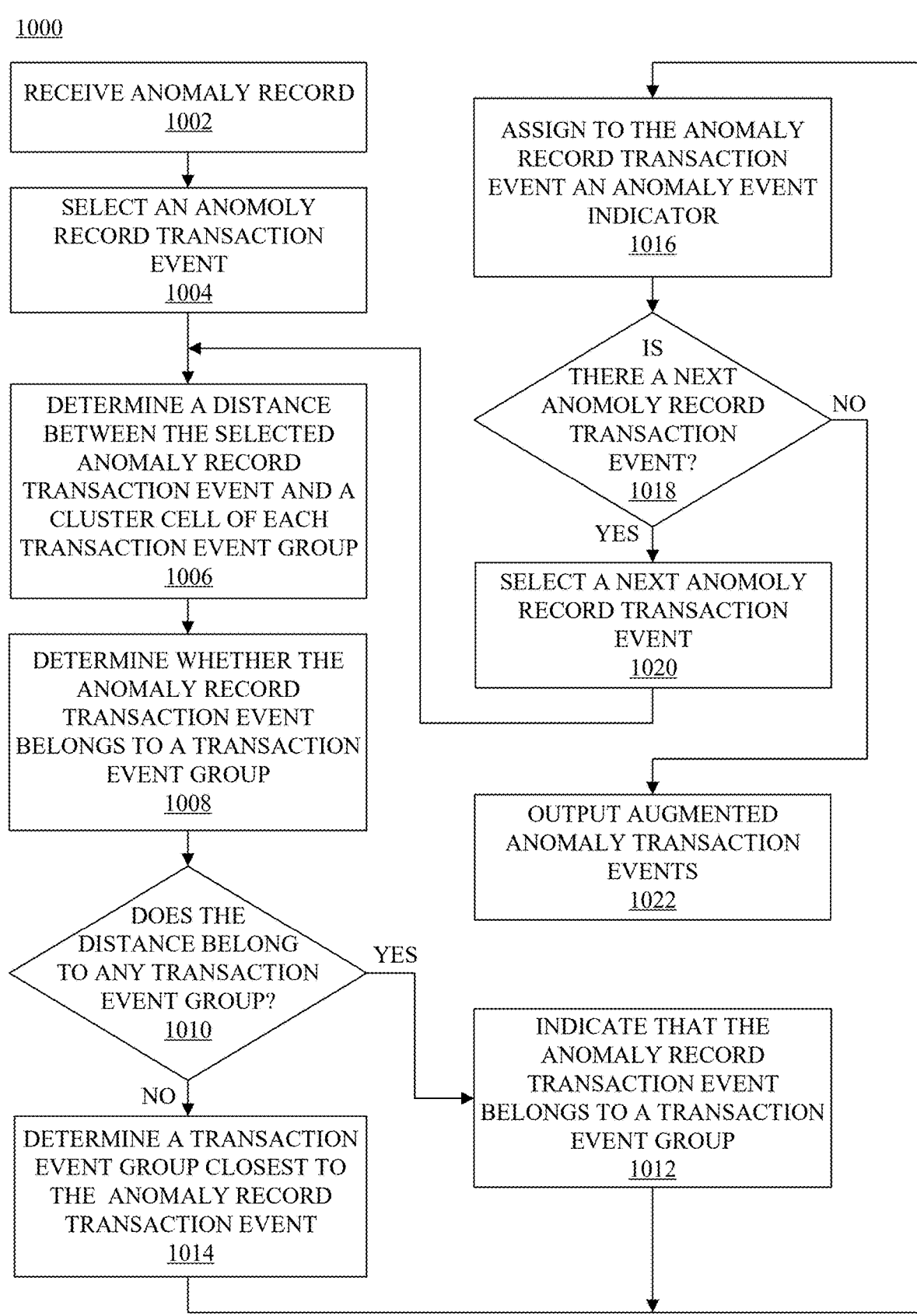
FIG. 10 is a flowchart illustrating a method of determining augmented anomaly transaction events.

FIG. 10 is a flowchart illustrating a method 1000 of determining augmented anomaly transaction events 336. Augmented anomaly detector 306 (e.g., augmented anomaly detection model 334) can determine augmented anomaly transaction events 336 by performing a process described by method 1000.

At step 1002, augmented anomaly detection model 334 can receive anomaly record 354 from detection model 324.

At step 1004, augmented anomaly detection model 334 can select an anomaly record transaction event (i.e., a transaction event contained in anomaly record 354).

At step 1006, augmented anomaly detection model 334 can determine a distance (d) between the selected anomaly record transaction event and the center of a cluster cell of each transaction event group 432, 434, 436. Augmented anomaly detection model 334 can determine the distance as follows:

$$d_i = \|C_i - t_i\|$$

where:
    $t_i$=value (e.g., a vector) of anomaly record transaction event i;
    $C_i$=value (e.g., a vector) of the center of the cluster cell for transaction event group 432, 434, 436 to which anomaly record transaction event i is compared; and
    $d_i$=distance (e.g., a vector) of anomaly record transaction event i from the center of the cluster cell At step 1008, for the selected anomaly record transaction event, augmented anomaly detection model 334 can determine whether that anomaly record transaction event belongs to any transaction event group 432, 434, 436. In illustration, the anomaly record transaction event can be determined to belong to a transaction event group 432, 434, 436 if the following condition is met:

$$d_i \le r_i$$

where $r_i$ is the radius of the cluster cell (i.e., cluster radius) to which the transaction event group 432, 434, 436 is assigned.

Referring to decision box 1010, if the anomaly record transaction event is determined to belong to a transaction event group 432, 434, 436, at step 1012 augmented anomaly detection model 334 can indicate that the anomaly record transaction event belongs to a transaction event group 432, 434, 436, for example by assigning a value of "yes" to the anomaly record transaction event. If, however, the anomaly record transaction event is determined not to belong to a transaction event group 432, 434, 436, at step 1014 augmented anomaly detection model 334 can assign a value of "no" to the anomaly record transaction event and determine a transaction event group 432, 434, 436 to which the anomaly record transaction event is closest. In illustration, to determine a transaction event group 432, 434, 436 to which the anomaly record transaction event is closest, augmented anomaly detection model 334 can determine the percentage of the distance $(d_i)$ larger than a radius $(r_i)$ of each transaction event group 432, 434, 436 as follows:

$$\min_i \frac{\|d_i - r_i\|}{r_i}$$

Augmented anomaly detection model 334 can determine for which transaction event group 432, 434, 436 the determined percentage of the distance $(d_i)$ larger than a radius $(r_i)$ is lowest.

At step 1016 augmented anomaly detection model 334 can assign to the selected anomaly record transaction event an anomaly event indicator. The anomaly event indicator can be in the following form $\{t_i, \text{yes}|\text{no}, j\}$, as previously described with reference to FIG. 3. As noted:

t indicates an instance of the augmented anomaly transaction event in anomaly record 354;

i is a record identifier for the augmented anomaly transaction event in anomalous transaction events 352;

j a group identifier for a transaction event group 432, 434, 436 to which the augmented anomaly transaction event belongs or is closest;

yes indicates to report the augmented anomaly transaction event as a warning (e.g., a low level anomaly); and no indicates to report the augmented anomaly transaction event as an Alert (e.g., a high level anomaly).

Thus, if the anomaly record transaction event is assigned a value of "yes," the anomaly event indicator can be in the following form:

$$\{t_i, \text{yes}, j\}$$

If, however, the anomaly record transaction event is assigned a value of "no," the anomaly event indicator can be in the following form:

$$\{t_i, \text{no}, j\}$$

Referring to decision box 1018, if there is a next anomaly record transaction event to be selected, at step 1020 augmented anomaly detection model 334 can select a next anomaly record transaction event from anomaly record 354.

In one or more arrangements, augmented anomaly detection model 334 need only determine distance $(d_i)$ for a portion of anomaly record transaction events. Accordingly, the next anomaly record transaction event need not be a sequentially next record in anomaly record 354, though the present arrangements are not limited in this regard. For example, distance $(d_i)$ can be determined for specific records of instance t. If, however, there is a next anomaly record transaction event to be selected, at step 1022 augmented anomaly detection model 334 can add each of the anomaly event indicators to augmented anomaly transaction events 336 output augmented anomaly transaction events 336 to augmented anomaly analyzer.

Figure 11:
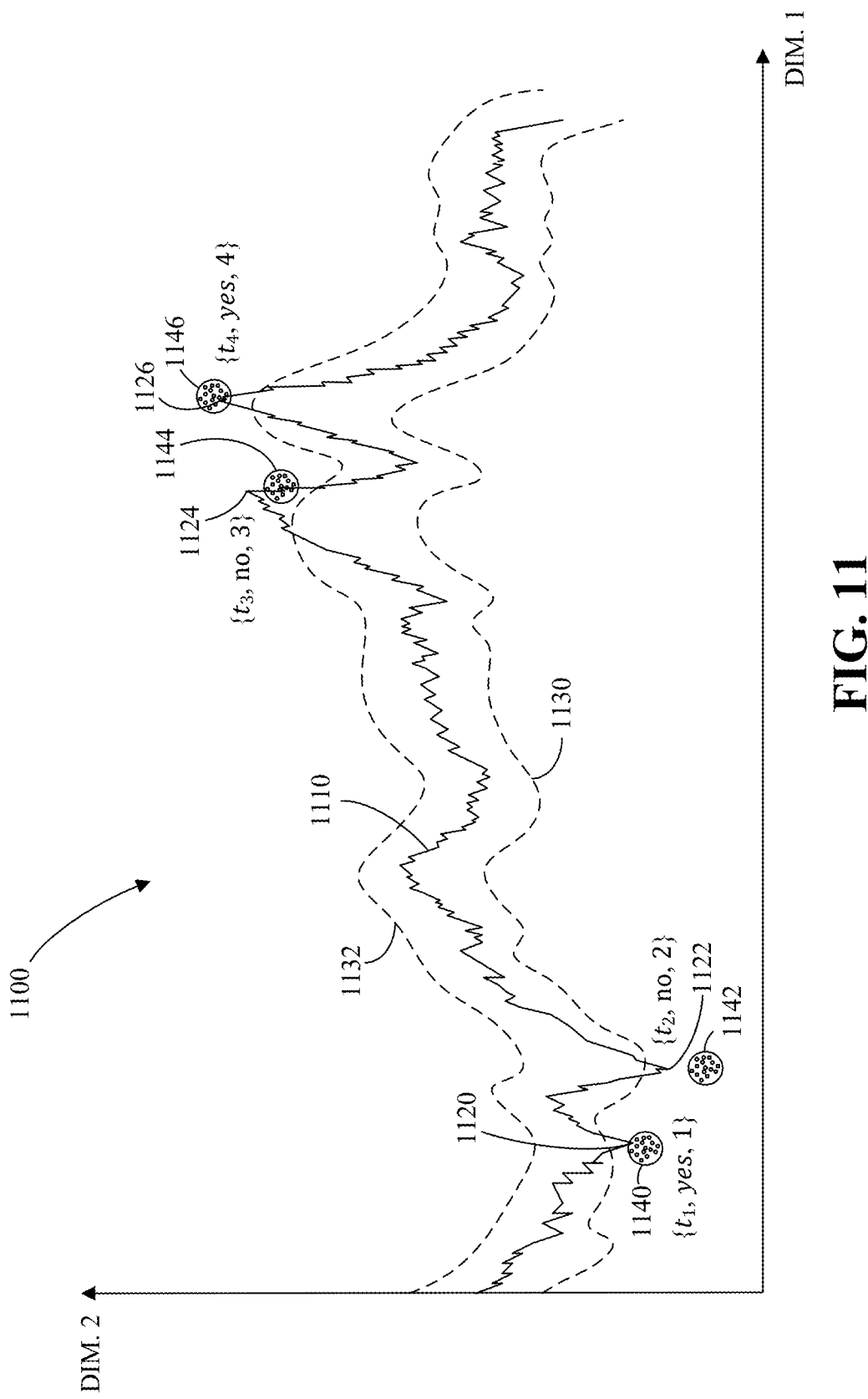
FIG. 11 is a chart depicting an example augmented anomalous transaction event detection.

FIG. 11 is a chart 1100 depicting an example of augmented anomalous transaction event detection. Chart 1100 can represent two or more dimensions. In illustration, DIM. 1 can be on a horizontal axis of chart 1100 and DIM. 2 can be on a vertical axis of chart 1100. By way of a non-limiting example, DIM. 1 can represent time stamps and DIM. 2 can represent latency. The present arrangements are not limited in this regard, however. For instance, DIM. 2 can represent a combination of two or more parameters, such as latency, memory utilization, processor utilization, waiting time, etc.

Chart 1100 depicts a plot of a series of transaction events 1110. Included in the series of transaction events 1110 are augmented anomaly transaction events 1120, 1122, 1124, 1126.

Chart 1100 also depicts minimum baseline values 1130 and maximum baseline values 1132. In one or more non-limiting arrangements, baseline values 1130, 1132 can be determined based on an expected value, such as a moving average, of the series of transaction events 1110. In this regard, the expected value can change depending on position of augmented anomaly transaction events 1120, 1122, 1124, 1126 with respect to the horizontal axis. Minimum baseline values 1130 can be determined by subtracting a value (e.g., a pre-determined value) from the moving average, and maximum baseline values 1132 can be determined by adding a value (e.g., a pre-determined value) to the moving average. Nonetheless, the present arrangements are not limited in this regard; baseline values 1130, 1132 can be determined in any other suitable manner.

Chart 1100 also depicts cluster cells 1140, 1142, 1144, 1146 created for transaction event groups 430 during augmented anomaly detection model training 420 by discrete distribution trainer 332. Since cluster cells 1140, 1142, 1144, 1146 are determined based on noisy data 314, cluster cells 1140, 1142, 1144, 1146 can outside of minimum baseline values 1130 and maximum baseline values 1132. For instance, cluster cells 1140, 1142 can be below minimum baseline values 1130 and cluster cells 1144, 1146 can be above maximum baseline values 1132.

In this example, "1" is a record identifier (i) for augmented anomaly transaction event 1120, cluster cell 1140 is for a transaction event group 432 assigned "1" as a group identifier (j), and the value of augmented anomaly transaction event 1120 falls within cluster cell 1140 (i.e., $d_1 \leq r_1$). Since the value of augmented anomaly transaction event 1120 falls within cluster cell 1140, the value of anomaly event indicator assigned to augmented anomaly transaction event 1120 is "yes." Accordingly, the anomaly event indicator assigned to augmented anomaly transaction event 1120 can be $\{t_1, \text{yes}, 1\}$. Based on similar reasoning, the anomaly event indicator assigned to augmented anomaly transaction event 1126 can be $\{t_4, \text{yes}, 4\}$.

Because the values of anomaly event indicators for augmented anomaly transaction events 1120, 1126 are "yes,"

augmented anomaly analyzer 342 can report each augmented anomaly transaction event 1120, 1126 as a warning or low priority anomaly in anomaly reports 360.

In this example, "2" is a record identifier (i) for augmented anomaly transaction event 1122, cluster cell 1142 is for a transaction event group 434 assigned "2" as a group identifier (j), and the value of augmented anomaly transaction event 1122 falls outside of cluster cell 1142 (i.e., $d_1 \rightarrow r_1$). Since the value of augmented anomaly transaction event 1122 falls outside of cluster cell 1142, the value of anomaly event indicator assigned to augmented anomaly transaction event 1122 is "no." Accordingly, the anomaly event indicator assigned to augmented anomaly transaction event 1122 can be {$t_2$, no, 2}. Based on similar reasoning, the anomaly event indicator assigned to augmented anomaly transaction event 1124 can be {$t_3$, no, 3}.

Because the values of anomaly event indicators for augmented anomaly transaction events 1122, 1124 are "no," augmented anomaly analyzer 342 can report each augmented anomaly transaction event 1122, 1124 as an alert or a high (e.g., top) priority anomaly in anomaly reports 360.

Figure 12:
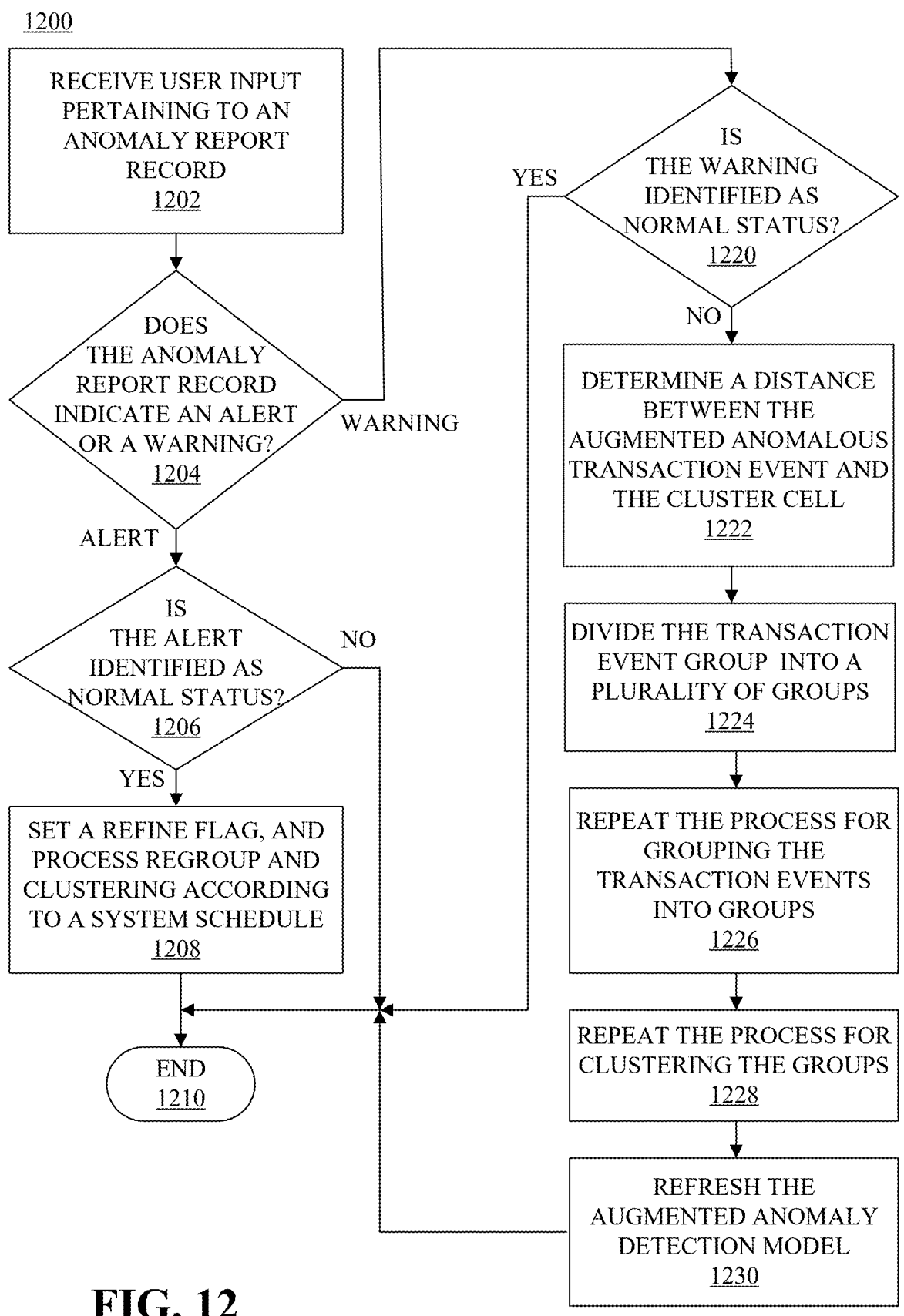
FIG. 12 is a flowchart illustrating a method of refining a bias of an augmented anomaly detection model.

FIG. 12 is a flowchart illustrating a method 1200 of refining a bias of an augmented anomaly detection model 334. Bias refiner 344 can refine augmented anomaly detection model 334 by performing a process described by method 1200. Method 1200 introduces user behavior to correct detection results of detection model 324 to ensure identification of anomalous transaction events (ATE) 352 by detection model 324 is trustworthy. In this regard, trustworthy AI analyzer 340 can be implemented to ensure detection model 324 provides results with high levels of trustworthiness and reliability. Moreover, trustworthy AI analyzer 340 can implement processes that adhere to ethical principles, legal regulations and user expectations, while avoiding potential risks and adverse impacts.

At step 1202, bias refiner 344 can receive a user input 364 pertaining to an anomaly report record contained in anomaly reports 360.

Referring to decision box 1204, if the anomaly report record pertains to an alert, the process can proceed to decision box 1206.

Referring to decision box 1206, if the user input 364 indicates that the alert is identified as normal status, which means that an event to which the alert pertains is normal status and there should not have been an alarm reported, at step 1208 bias refiner 344 can set a refine flag indicating that augmented anomaly detection model 334 is to be refined. Further, bias refiner 344 can schedule a process to repeat at least a portion of augmented anomaly detection model training 420 (FIG. 4) according to a system schedule. For instance, bias refiner 344 can schedule a process to repeat step 426 for group validation and repeat step 440 for clustering of the transaction event groups 432, 434, 436 for refine augmented anomaly detection model 334. The process can end at step 1210.

Referring again to decision box 1206, if the user input 364 indicates that the alert is not identified as being normal status, which means that an event to which the alert pertains is abnormal status and reporting of the alarm was correct, the process can proceed to step 1210 and end. In this regard, if the user input 364 indicates that the alert is proper, no further action and/or refinement of augmented anomaly detection model 334 need be performed responsive to the present user input 364.

Referring again to decision box 1204, if the anomaly report record pertains to a warning, the process can proceed to decision box 1220. Referring to decision box 1220, if the warning is identified as normal status, the process can proceed to step 1210 and end. If, however, the warning is not identified as normal status, the process can proceed to step 1222.

At step 1222, bias refiner 344 can determine a distance ($D_x$) between the augmented anomalous transaction event, represented by the anomaly report record, and the cluster cell identified by the anomaly report record. The distance ($D_x$) can be a vector that is determined as follows:

$$D_x = \|C_i - x\|$$

where:
  $C_i$=value (e.g., a vector) of the center of the cluster cell for the transaction event group identified by the augmented anomaly transaction event 336 to which anomaly report record pertains; and
  x=value (e.g., a vector) of the augmented anomaly transaction event 336 to which anomaly report record pertains.

At step 1224, bias refiner 344 can divide the transaction event group, identified by the augmented anomaly transaction event 336 to which anomaly report record pertains, into a plurality of transaction event groups.

At step 1226, bias refiner 344 can repeat step 426 (FIG. 4) for group validation. During this process, the vector distribution density ($D_M$) determined at step 622 (FIG. 6) can be set to the distance ($D_x$) between the augmented anomalous transaction event, represented by the anomaly report record, and the cluster cell identified by the anomaly report record. In one or more non-limiting arrangements, to conserve processing resources (e.g., memory utilization, processor utilization, etc.), bias refiner 344 can limit the repeat of step 426 to the transaction event groups that result from dividing the original transaction event group.

At step 1228, bias refiner 344 can repeat step 440 for clustering of the transaction event groups. In one or more non-limiting arrangements, to conserve processing resources (e.g., memory utilization, processor utilization, etc.), bias refiner 344 can limit the repeat of step 440 to the transaction event groups that result from dividing the original transaction event group.

At step 1230, bias refiner 344 can refresh the augmented anomaly detection model 334.

The process can end at step 1210.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Several definitions that apply throughout this document will now be presented.

As defined herein, the term "transaction event" means an occurrence of a data processing transaction.

As defined herein, the term "anomalous transaction event" means a transaction event indicated in runtime data, where a value of at least one parameter of the transaction event differs from an expected value of the at least one parameter by at least a threshold amount.

As defined herein, the term "noisy data" means data parsed from historical data, the data that is parsed from the historical data representing one or more transaction events, where a value of at least one parameter of the transaction events differs from an expected value of the at least one parameter by at least a threshold amount.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "user" means a person (i.e., a human being).

What is claimed is:

1. A method, comprising:
    receiving noisy data parsed from raw data, the noisy data indicating a plurality of first transaction events determined to be noise in the raw data;
    generating a plurality of vector pairs corresponding to the plurality of first transaction events, each vector pair of the plurality of vector pairs comprising a delta value for a respective first transaction event of the plurality of first transaction events and a value of the respective transaction event of the plurality of first transaction events, wherein the delta value is a difference between the value of the respective transaction event and a closest baseline value;
    training, using the noisy data, the plurality of vector pairs, and a processor, a first detection model to assign anomaly event indicators to second transaction events;
    receiving, by the first detection model, an anomaly record, the anomaly record indicating at least a portion of anomalous transaction events identified in runtime data; and
    assigning, by the first detection model, the anomaly event indicators to the anomalous transaction events, the anomaly event indicators indicating levels of severity of the anomalous transaction events identified in the runtime data.

2. The method of claim 1,
wherein the first detection model comprises:
    a plurality of cluster cells, each cluster cell, of the plurality of cluster cells representing a respective transaction event group; and
    a respective cluster radius for each cluster cell.

3. The method of claim 2,
wherein the training, using the noisy data, the first detection model to assign the anomaly event indicators to the second transaction events comprises:
    determining transaction event groups based on the plurality of vector pairs; and
    clustering the transaction event groups into the plurality of cluster cells.

4. The method of claim 1,
wherein the assigning, by the first detection model, the anomaly event indicators to the anomalous transaction events comprises:
    selecting an anomalous transaction event from the anomaly record;
    determining a distance between the selected anomalous transaction event and each of a plurality of cluster cells; and
    determining the selected anomalous transaction event to belong to a transaction event group based on the distance between the selected transaction event and the cluster cell for that transaction event group being less than or equal to a radius of the cluster cell.

5. The method of claim 1,
wherein the assigning, by the first detection model, the anomaly event indicators to the anomalous transaction events comprises:
    selecting an anomalous transaction event from the anomaly record;
    determining a distance between the selected anomalous transaction event and each of a plurality of cluster cells; and
    determining a transaction event group to which the selected anomalous transaction event is closest.

6. The method of claim 1,
wherein the receiving, by the first detection model, the anomaly record comprises receiving the anomaly record, using the first detection model, from a second detection model processing the runtime data.

7. The method of claim 1, further comprising:
outputting, by the first detection model, augmented anomaly transaction events, the augmented anomaly transaction events comprising the anomaly event indicators;

receiving at least one user input indicating an augmented anomaly transaction event is incorrectly identified; and responsive to receiving the at least one user input indicating the augmented anomaly transaction event is incorrectly identified, refining, based on the at least one user input, the first detection model to improve accuracy of the first detection model at determining the augmented anomaly transaction events.

8. A system, comprising:

one or more processors; and one or more memory devices coupled to the one or more processors, wherein the one or more processors are configured to:

receive noisy data parsed from raw data, the noisy data indicating a plurality of first transaction events determined to be noise in the raw data;

generate a plurality of vector pairs corresponding to the plurality of first transaction events, each vector pair of the plurality of vector pairs comprising a delta value for a respective first transaction event of the plurality of first transaction events and a value of the respective transaction event of the plurality of first transaction events, wherein the delta value is a difference between the value of the respective transaction event and a closest baseline value;

train, using the noisy data and the plurality of vector pairs, a first detection model to assign anomaly event indicators to second transaction events;

receive, using the first detection model, an anomaly record, the anomaly record indicating at least a portion of anomalous transaction events identified in runtime data; and assign, using the first detection model, the anomaly event indicators to the anomalous transaction events, the anomaly event indicators indicating levels of severity of the anomalous transaction events identified in the runtime data.

9. The system of claim 8, wherein the first detection model comprises:

a plurality of cluster cells, each cluster cell, of the plurality of cluster cells, representing a respective transaction event group; and a respective cluster radius for each cluster cell.

10. The system of claim 9, wherein the one or more processors, to train the first detection model, are configured to:

determine transaction event groups based on the plurality of vector pairs; and cluster the transaction event groups into the plurality of cluster cells.

11. The system of claim 8, wherein the one or more processors, to assign the anomaly event indicators to the anomalous transaction events, are configured to:

select an anomalous transaction event from the anomaly record;

determine a distance between the selected anomalous transaction event and each of a plurality of cluster cells; and determine the selected anomalous transaction event to belong to a transaction event group based on the distance between the selected transaction event and the cluster cell for that transaction event group being less than or equal to a radius of the cluster cell.

12. The system of claim 8, wherein the one or more processors, to assign the anomaly event indicators to the anomalous transaction events, are configured to:

select an anomalous transaction event from the anomaly record;

determine a distance between the selected anomalous transaction event and each of a plurality of cluster cells; and determine a transaction event group to which the selected anomalous transaction event is closest.

13. The system of claim 8, wherein the one or more processors, to receive, the anomaly record, are configured to:

receive, using the first detection model, the anomaly record from a second detection model processing the runtime data.

14. The system of claim 8, the one or more processors are configured to:

output, by the first detection model, augmented anomaly transaction events, the augmented anomaly transaction events comprising the anomaly event indicators;

receive at least one user input indicating an augmented anomaly transaction event is incorrectly identified; and responsive to receiving the at least one user input indicating the augmented anomaly transaction event is incorrectly identified, refine, based on the at least one user input, the first detection model to improve accuracy of the first detection model at determining the augmented anomaly transaction events.

15. A non-transitory computer-readable medium storing a set of instructions for wireless communication, the set of instructions comprising:

one or more instructions that, when executed by one or more processors of a device, cause the device to:

receive noisy data parsed from raw data, the noisy data indicating a plurality of first transaction events determined to be noise in the raw data;

generate a plurality of vector pairs corresponding to the plurality of first transaction events, each vector pair of the plurality of vector pairs comprising a delta value for a respective first transaction event of the plurality of first transaction events and a value of the respective transaction event of the plurality of first transaction events, wherein the delta value is a difference between the value of the respective transaction event and a closest baseline value;

train, using the noisy data and the plurality of vector pairs, a first detection model to assign anomaly event indicators to second transaction events;

receive, using the first detection model, an anomaly record, the anomaly record indicating at least a portion of anomalous transaction events identified in runtime data; and assign, using the first detection model, the anomaly event indicators to the anomalous transaction events, the anomaly event indicators indicating levels of severity of the anomalous transaction events identified in the runtime data.

16. The non-transitory computer-readable medium of claim 15, wherein the first detection model comprises:

a plurality of cluster cells, each cluster cell, of the plurality of cluster cells representing a respective transaction event group; and a respective cluster radius for each cluster cell.

17. The non-transitory computer-readable medium of claim 16, wherein the one or more instructions, to cause the device to train the first detection model, cause the device to:

determine transaction event groups based on the plurality of vector pairs; and cluster the transaction event groups into the plurality of cluster cells.

18. The non-transitory computer-readable medium of claim 15, wherein the one or more instructions, to cause the device to assign the anomaly event indicators to the anomalous transaction events, cause the device to:

select an anomalous transaction event from the anomaly record;

determine a distance between the selected anomalous transaction event and each of a plurality of cluster cells; and determine the selected anomalous transaction event to belong to a transaction event group based on the distance between the selected transaction event and the cluster cell for that transaction event group being less than or equal to a radius of the cluster cell.

19. The non-transitory computer-readable medium of claim 15, wherein the one or more instructions, to cause the device to assign the anomaly event indicators to the anomalous transaction events, cause the device to:

select an anomalous transaction event from the anomaly record;

determine a distance between the selected anomalous transaction event and each of a plurality of cluster cells; and determine a transaction event group to which the selected anomalous transaction event is closest.

20. The non-transitory computer-readable medium of claim 15, wherein the one or more instructions, to cause the device to receive the anomaly record, cause the device to:

receive, using the first detection model, the anomaly record from a second detection model processing the runtime data.

\* \* \* \* \*